United States Patent

Stock

[15] 3,660,597

[45] May 2, 1972

[54] METHOD AND APPARATUS FOR SCANNING AND SENSING COLORED PATTERNS

[72] Inventor: Hans Joachim Stock, Freiburg im Breisgau, Germany

[73] Assignee: Franz Morat GmbH, Stutgart-Vaihingen, Germany

[22] Filed: Nov. 12, 1970

[21] Appl. No.: 88,724

Related U.S. Application Data

[62] Division of Ser. No. 694,032, Dec. 27, 1967, Pat. No. 3,578,897.

[30] Foreign Application Priority Data

Dec. 27, 1966 Germany ..............................7218725

[52] U.S. Cl. ..........................................................178/5.2 A

[51] Int. Cl. ..........................................................G03f 3/08

[58] Field of Search.......................178/5.2 A; 355/38, 82, 88

[56] References Cited

UNITED STATES PATENTS 2,981,792 4/1961 Farber ...............................178/5.2 A

*Primary Examiner*—Benedict V. Safourek
*Assistant Examiner*—John C. Martin
*Attorney*—Michael S. Striker

[57] ABSTRACT

Three photosensitive elements, such as photodiodes, one for each of the colors red, green and blue, scan, point-by-point, and sense the colors of a pattern. The voltages corresponding to the three colors are so amplified substantially an equal amount that the voltage corresponding to the brightest of the colors is raised to a fixed value of that is independent of the color brightness.

15 Claims, 10 Drawing Figures

INVENTOR
HANS JOACHIM STOCK
By: [signature]
Attorney

INVENTOR:
HANS-JOACHIM STOCK

By Ulrich J. Steiner
Attorney

INVENTOR:
HANS JOACHIM STOCK
By: Michael J. Striker
Attorney

INVENTOR:
HANS JOACHIM STOCK
By: [illegible]
Attorney

INVENTOR:
HANS JOACHIM STOCK
By [signature]
Attorney

INVENTOR:
HANS JOACHIM STOCK

By: Michael S. Striker
Attorney

INVENTOR:
HANS JOACHIM STOCK

By: [signature]
Attorney

INVENTOR:
HANS JOACHIM STOCK

By:
Attorney

METHOD AND APPARATUS FOR SCANNING AND SENSING COLORED PATTERNS

This application is a division of application Ser. No. 694,032, now U.S. Pat. No. 3,578,897, filed Dec. 27, 1967.

BACKGROUND OF THE INVENTION

The invention relates to a method and apparatus for optically scanning, point-by-point, and electrically sensing colored patterns, each point being sensed for a plurality of spectral ranges, and there being produced for each spectral range a signal, the amplitude of which is proportional to the brightness of that range.

Printing, the manufacture of knitted and woven goods and of mosaic pictures, and the making of other flat, colored objects are more and more frequently undertaken with electronically controlled machines. "Electronic control" is here intended to mean that the individual parts of the machine are operated by electrical signals conducted to these parts so that the desired colored pattern is exactly reproduced by the machine. For example, with knitted goods each stitch, with mosaic pictures each mosaic stone, corresponds to, and has the color of, a particular spot on the master pattern.

There are two different ways of electronically controlling the machines. In the one way, the pattern is optically scanned, point-by-point, and each point sensed by phototransducers. The signals obtained for each sensed point are evaluated and sent immediately to the operating machine, which is caused, in response to these signals, to choose the threads, the mosaic stone, the colors, or whatever it may be, that will reproduce the point being sensed. In the other way, the signals obtained for each sensed point are recorded on punched tape, on film, or on magnetic tape, for example, and the actual control signals are obtained, in case of need, by reproducing the recorded signals.

Both methods have in common the fact that the quality of the resulting object depends greatly on the exactness with which the master pattern is scanned and sensed, since scanning and sensing errors result in corresponding errors in the finished object.

The optical-electrical scanning and sensing unit comprises, broadly speaking, one or more photosensitive transducers connected to an electrical circuit for evaluating and normalizing the signals. The light path between the master pattern and the photosensitive transducers contains an optical system consisting of lenses and filters.

In accordance with a suggestion in the DT-OS 15 226.3 (D 3097) the phototransducers can be photocells, each cell responding to light of a different narrow spectral range. If the cells are moved over the pattern, each point sensed causes a signal in only that cell corresponding to the color of the sensed point.

The disadvantages of these and other optical-electrical scanning and sensing arrangements are always that the amplitude of the electrical signals generated depends, for example, on the illumination of the master pattern during scanning, and the spacing between the photosensitive transducers and the pattern, on the transmissivity or reflectivity of the colors used for the master pattern, and on other, essentially optical, characteristics. Changes in these characteristics during operation will cause errors in the reproduced pattern.

SUMMARY OF THE INVENTION

An object of the invention is a method and apparatus for avoiding the aforementioned disadvantages. The method of the invention consists essentially of the steps of optically scanning the pattern point-by-point, sensing the color of each point by sensing a plurality of spectral ranges, producing for each spectral range an electrical signal of which the amplitude corresponds to the light intensity of that spectral range, amplifying that electrical signal associated with the spectral range having the greatest intensity to a constant value, and amplifying each remaining electrical signal with the same amplification factor that its value is an indication of the ratio between the intensity of the light from the corresponding spectral range and the intensity of the light of that spectral range having the greatest intensity.

The arrangement of the invention consists essentially of a plurality of phototransducers for receiving light reflected from, or transmitted through, the pattern, each of the phototransducers being responsive to a different spectral range, amplifier means having a plurality of amplifiers, each amplifier being connected to a respective one of the phototransducers, and a control circuit connected to a respective one of the phototransducers and a control circuit connected to the amplifier means for so maintaining a substantially equal amplification factor for all of the amplifiers for each point scanned and sensed that the output of that amplifier corresponding to the phototransducer receiving light of greater intensity than the other phototransducer has a constant value, for all points scanned, independent of the intensity of the light incident upon the phototransducer.

An important advantage of the invention is that variations in illumination of the pattern, or a reflectivity or transmissivity factor that varies from sensed point to sensed point, cannot influence detection of the colors, provided that, for any given point sensed, the light sensitive transducer corresponding to the dominant color of that point receives more illumination than the other transducers. Except for extreme cases, this condition is always fulfilled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
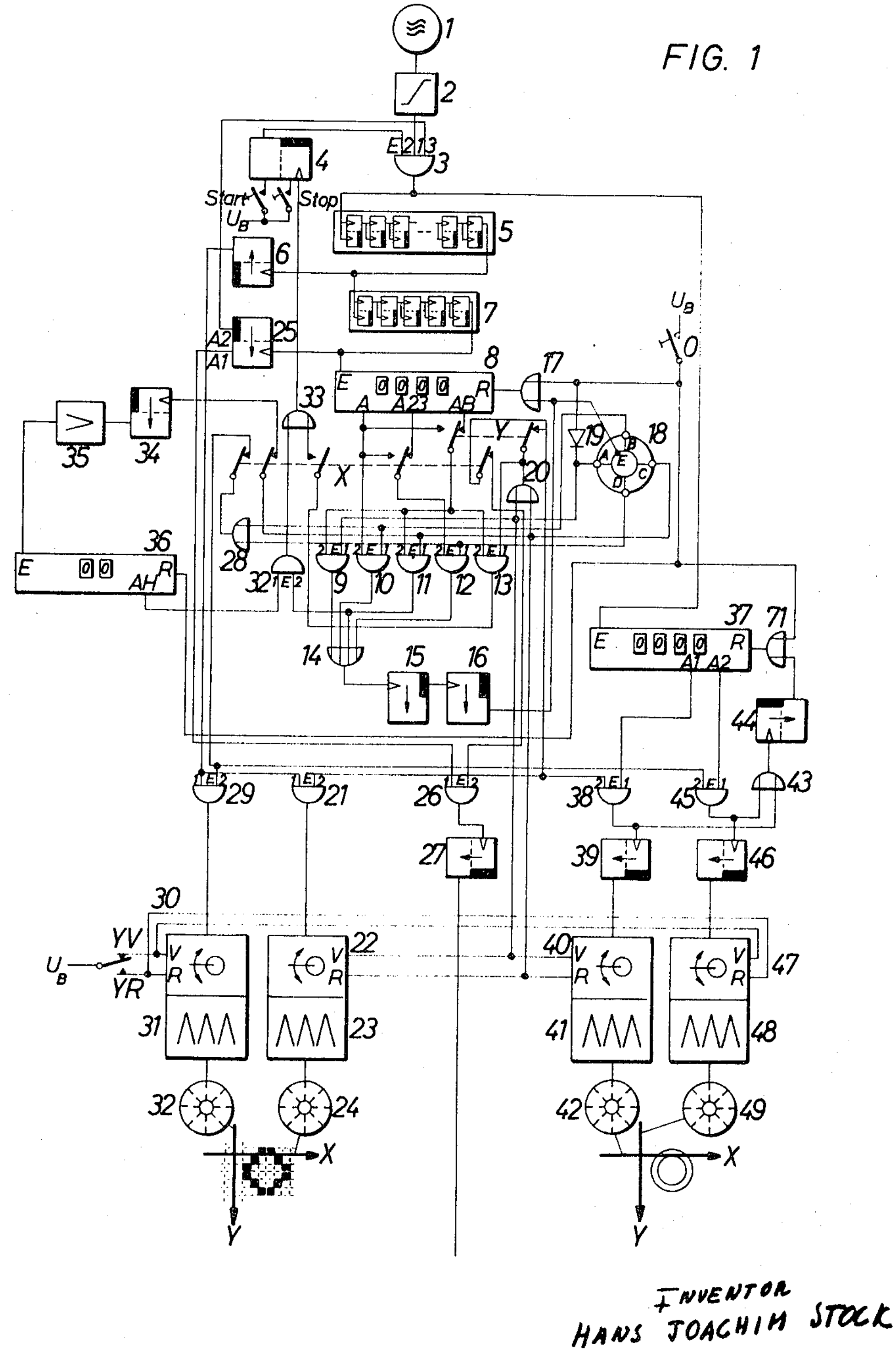
FIG. 1 is a functional logic diagram of the complete circular arrangement of the invention.

The arrangement consists of two coordinate plotters MS1 and MS2 having carriages driven in both directions by the step motors 24, 32, 42 and 49. The drawing of the pattern to be scanned, is laid upon the suction table of the coordinate plotter. The color-sensitive scanning head 72 which scans simultaneously twelve lines of the pattern, is located in place by the plotter carriage. The pattern to be scanned may be either screened or not in one of three colors, red, green, or blue. The screened pattern may be laid upon graph paper such as millimeter paper having a scale corresponding to the magnitude of the stitch such as, for example, $0.8 \times 0.8$ mm$^2$ to $2 \times 2$ mm$^2$. Thus, the scale to be selected corresponds to the one that is practically applicable. Blank card stock is placed upon the suction table of the other coordinate plotter, and becomes printed through the color printing head 73 conveyed to the desired location by the plotter carriage. The color printing head 73 has three dot printers 67, 68, and 69 corresponding to the colors red, green, and blue. Twelve lines are printed simultaneously in a precise 2 mm grid corresponding to the color signals received. These color signals are delivered by the color scanning head 72 which transmits the proper signals through means of the color recognition circuit and signal-shaping circuit 53–63 in FIG. 1*a*. The signal-shaping or processing circuit is arranged so that only one signal is provided when red, green or blue prevail. No signal is emitted when white prevails or when there is a mixture of colors. In this manner, when a pattern has two different colors, the border between the different colors requires only that manual correction be made later on in order to enter the correct colors. It is not necessary to eliminate or remove incorrectly printed colors.

A fixed frequency controls the step motors 24 and 32 of the second coordinate plotter MS2 upon which the screened drawing is printed. After traversing 2 mm a control pulse is emitted which initiates the printing operation. The spet-motors of the first coordinate plotter corresponding to the elements 42 and 49, are controlled by a frequency which is a function of the scale of the pattern being scanned. This frequency is coupled to the frequency of the second machine because both frequencies are derived from a single signal generator 1 by means of frequency division.

The 670 KHz sinusoidal signal of this generator 1 is converted to a square wave by means of the square wave generator 2. The resulting square wave signal is transmitted to an AND gate 3. This AND gate has a second input from the bistable or flip flop circuit 4. The signal from the flip flop 4 is transmitted when the "start" pushbutton is depressed, and ceases to be transmitted when the "stop" pushbutton is depressed.

The third input to the AND gate 3 is continuously transmitted from the output A2 of the monostable multivibrator 25. The signal is interrupted only for approximately 5 milliseconds when the multivibrator circuit 25 receives an initiating pulse, described in greater detail below. Upon depressing the "start" button therefore, the 670 KHz square wave signal appears at the output of the AND gate 3 and is transmitted further to the 12 stage binary divider 5. The latter reduces the frequency of the 670 KHz signal to approximately 164 Hz, corresponding to a ratio of 4096 : 1. The output of the AND gate 3 is also simultaneously transmitted to the electronic preselection counter 37. This counter has outputs A1 and A2 which are applied to the AND gates 38 and 45, respectively. These AND gates provide signals for controlling the step motors X and Y of the transport mechanism of the scanning machine. Each output provides pulses at an adjustable frequency that corresponds to the desired scale between the pattern scanned and the 2 mm grid of the printed drawing. The step motors X and Y are controlled in the desired relationship depending upon the scale relationship between the pattern scanned and the 2 mm grid of the printed drawing.

The 164 Hz signal of the dividing circuit 5 is applied to the AND gates 21 and 29 of the step motor control circuits 22 and 30, by way of the monostable multivibrator circuit 6. The control circuits 22 and 30 control the step motors of the screen or grid printing machine in the X and Y directions. The output of the dividing circuit 5 is also applied to a five stage binary dividing circuit 7. The latter further divides down the 164 Hz signal to approximately 5 Hz, corresponding to the ratio 32:1.

The mechanical driving mechanism of the carriage of the coordinate plotter for the grid printing machine is arranged so that 32 steps of the step motors correspond precisely to 2 mm of distance. The output of the divider 7 provides a control pulse after every 2 mm distance traversed. The output of the divider 7 is applied to the monostable multivibrator 25 which, in turn, applies a signal to the AND gate 26 through its output A1. The signal to the AND gate 26 controls the color scanning control circuit. The output A2 of the monostable multivibrator circuit 25 causes, after every 2 mm step, the interruption mentioned above in the 670 KHz square wave signal. This interruption is approximately 45 milliseconds. This signal interruption is produced so that the many subsequent circuit functions do not all have to be carried out within a period of the 670 KHz frequency when the signal is particularly the last one associated with continuous motion in a single direction.

On the other hand, these control pulses are transmitted to an electronic preselection counter 8 which functions in the control of the transport operation of the carriages of both plotting machines.

The scanning head 72 as well as the print head 73 each traverse 12 lines. However, because of their mechanical construction, they leave a border space of one line. As a result, the operating motion of the carriages of both machines is as follows: from the initial position set manually, movement results in the X direction of a predetermined amount at, for example, 420 grid steps for a pattern. In circular knitting machines this corresponds to four times a cylinder circumference of 1680 needles. After that, a grid step takes place in the Y direction. Upon the return motion in the X direction of 420 grid steps, the omitted lines are traversed, and 23 grid steps take place in the Y direction after the return motion in the X direction. This cycle is repeated until the entire pattern is scanned. Circuit operation is discontinued upon the repeated grid count divided by 24 and the setting of the counter 36 with the next highest count. The counters 8, 36, and 37 as well as the four stage ring counter 18 are returned to their initial state through the switch 0, before the beginning of the scanning operation. In the ring counter 18, this initial state corresponds to the stage A.

The ring counter 18 provides a signal to the second inputs of the AND gates 21, 26 and 38, by way of the OR gate 20. In this manner the 164 Hz signal is applied to the first input of the AND gate 21, and therefore, in turn, to the direction control circuit 22 and the step motor control and step motor, 23 and 24, respectively. The step motor 24 is for the X direction of the grid printing machine. By way of the monostable multivibrator 25, the output of the dividing stage 7 is applied to the first input of the AND gate 26. The output of the AND gate 26 is applied to the pulse shaper in the form of a monostable multivibrator 27 and, in turn, to the color scanning circuit which actuates the printing mechanism for printing the colors scanned.

The AND gate 37 receives the output A1 from the settable counter 37. The latter is set in accordance with the scale selected. The pulses from the AND gate 38 are applied to a monostable multivibrator circuit 39 and, in turn, to the step motor control circuit 41 which actuates the step motor 42 of the scanning machine in the X direction. The signal from the stage A of the ring counter 18 is applied to the inputs V of the direction control circuits 22 and 40 associated with the X transport direction of the grid printing machine and the scanning machine. In this manner both step motors rotate in the forward direction. The signal from the stage A of the ring counter 18, furthermore, is applied to the AND gate 9.

If, now, the counter 8 attains the count to which it has been set, corresponding to the repeated width as, for example, 420, then the output AB provides a pulse to the second input of the AND gate 9. By way of the OR gate 14, the output of the AND gate 9 is applied to the delay monostable multivibrator 15. After the elapse of approximately 1 milliseconds, the monostable multivibrator circuit 16 receives a pulse from the circuit 15. This pulse, in turn, is applied to the counting input E of the ring counter 18. As a result, the ring counter 18 is advanced to the stage B. The output of the monostable multivibrator circuit 16 is also applied to the OR gate 17 which has its output connected to the reset input R of the counter 8. Therefore, the application of a pulse signal to the OR gate 17 causes the counter 8 to be reset to its initial or zero state. With this circuit operation the step motors 24 and 42 for the X direction of the grid printing machine and the scanning machine are also caused to become stationary. This results from the condition that the signal to the second inputs of the AND gates 21 and 38 from the stage A of the ring counter 18 has ceased. The same situation prevails at the second input to the AND gate 26 so that the color printing head remains inactive during the following Y transport.

The signal of the stage B of the ring counter 18, is now applied to the second inputs of the AND gates 29 and 45, by way of the OR gate 28. The AND gate 29 can now apply the signal received at its first input from the divider 5, to the direction control circuit 30. The divider 5 applies the 164 Hz signal to the AND gate 29 by way of the monostable multivibrator 6. The direction control circuit 30 is connected directly to the step motor control circuit 31 which in turn controls the step motor 32 for the Y direction of the grid printing machine. In a similar manner the AND gate 45 can deliver signals to the monostable multivibrator 46 connected to the direction control circuit 47. The latter cooperates with the step motor control circuit 48 for controlling the operation of the motor 49 in the Y direction of the scanning machine. The AND gate 45 receives its input signal from the output A2 of the counter 37 which is set in accordance with the desired scale. Aside from this the signal of the stage B of the ring counter 18, lies at the first input of the AND gate 10.

If now the counter 8 attains the count "1" to which it has been set, the output A1 provides a pulse to the second input of the AND gate 10. The output of the AND gate 10 is applied to the OR gate 14 and from there to the monostable multivibrator delay circuit 15. After the elapse of approximately 1 millisecond, the multivibrator circuit 15 actuates the monostable multivibrator 16 which, in turn, applies a pulse to the counting input of the ring counter 18. As a result, the latter is advanced to the stage C. The output of the pulse shaper or monostable multivibrator circuit 16 is also applied to the OR gate 17 which, in turn, resets the counter 8 to its zero state.

With this circuit operation the step motors 32 and 49 for the Y axis or direction of the grid printing machine and the scanning machine are also stationary. This is because the signal of stage B of the ring counter 18 is not applied to the second inputs of the AND gates 29 and 45. The Y axis of both machines has therefore executed a grid step. The signal of stage C of the ring counter 18 now actuates the step motors 24 and 42, by way of the OR gate 20, in a manner similar to that described above in relation to the signal of stage A. The signal of stage C lies at both inputs R of the direction control circuits 22 and 40 of the X axis of the grid printing machine and the scanning machine. As a result, the step motors 24 and 42 now run backwards.

The signal of stage C is also applied to the second input of the AND gate 26, by way of the OR gate 20. The color scanning circuit can therefore again receive the signals from the divider 7, by way of the pulse shaper or monostable multivibrator 25. The color printing head can, hence, print out the scanned colors after each 2 mm distance of the color printing head.

The signal of the stage C lies, further, at the first input of the AND gate 11. If, now, the counter 8 attains the count of the repeated width which in the foregoing example is 420, the output AB provides a pulse to the second input of the AND gate 11. The latter thus advances the ring counter 13 to its next stage D by way of the elements 14, 15, and 16, and causes the resetting of the counter 8, as described supra.

In this operating state of the circuit, the step motors 24 and 42 for the X axis of both machines and the color printing head are stationary. This is as a result of the condition that the signal of stage C of the ring counter 18 does not prevail at the second inputs of the AND gates 21, 26 and 38. Consequently, the signal of stage D is applied to the second inputs of the AND gates 29 and 45, by way of the OR gate 28. This in turn causes both machines to drive in the direction of the Y axis, in the same manner and in the same direction. The situation is the same as described before in relation to the signal of the stage B, with the exception that the signal of the stage D lies at the first input of the AND gate 12 and the reset terminal of the counter 8 as well as the advancing input of the ring counter 18. The initial stage A is first attained when, after 23 counts, the counter 8 provides a pulse from its output A23 to the second input of the AND gate 12. In this manner, both machines are moved further along the Y axis by 23 grid steps or intervals.

The foregoing cycle is repeated as often as necessary until the entire pattern is fully scanned.

Everytime the stage C of the ring counter 18 is switched in, the pulse shaper in the form of the monostable multivibrator 34 is actuated. After the pulse signal from the monostable multivibrator 34 is suitably amplified in the power amplifier 35, it is applied to the electromechanical counter 36, and causes this counter to advance by one digit. Prior to commencing the scanning operation, the counter is preset to the closest rounded-out number corresponding to the magnitude obtained by dividing the repeated stitch rows or lines by 24. In this manner the transport cycles or cycles of motion which are needed for completely scanning the pattern, are counted.

As described above, when the stage C of the ring counter 18 is switched on, the return motion in the X direction is begun and the counter 36 is advanced by one unit. If the counter 36 attains thereby the preset count, it emits a signal through its output AH and applies it to the first input of the AND gate 32. This signal to the AND gate 32 remains on until the counter becomes reset. When motion in the X direction has been completed, the AND gate 11 provides an output, as already described, and applies a pulse to the ring counter 18 by way of the circuit elements 14, 15 and 16. The ring counter 18 is thus advanced and at the same time the output from the AND gate 11 is also applied to the OR gate 17 for the purpose of resetting the counter 8. The output of the AND gate 11 is also applied to the second input of the AND gate 32. Since the first input of the AND gate is already present due to the output of the counter 36, the AND gate 32 transmits a pulse signal to the OR gate 33. As a result, the input designated "stop" of the flip flop 4 has a signal applied to it. The flip flop 4 is therefore switched to its opposite state. The output signal of this flip flop, which is applied to the second input of the AND gate 3, therefore ceases with the result that the 670 KHz square wave signal is no longer transmitted to the associated counters. Accordingly, further motion is discontinued.

Of the many step motors that are commercially available, only those may be used which are electronically reversible. With such a motor, taken for example, as a three-phase motor in which the coils are sequentially switched, every step of the motor corresponds to a switching operation. A three-stage ring counter count the number of applied pulses, and when the counting is in the reverse direction, the direction of the motor is likewise reversed. This reversal is executed through the means of an electronic bistable multivibrator or flip flop. Since these step motor controls are well known in the art and are generally shipped together with the motors, they will not be further described.

Figure 1A:
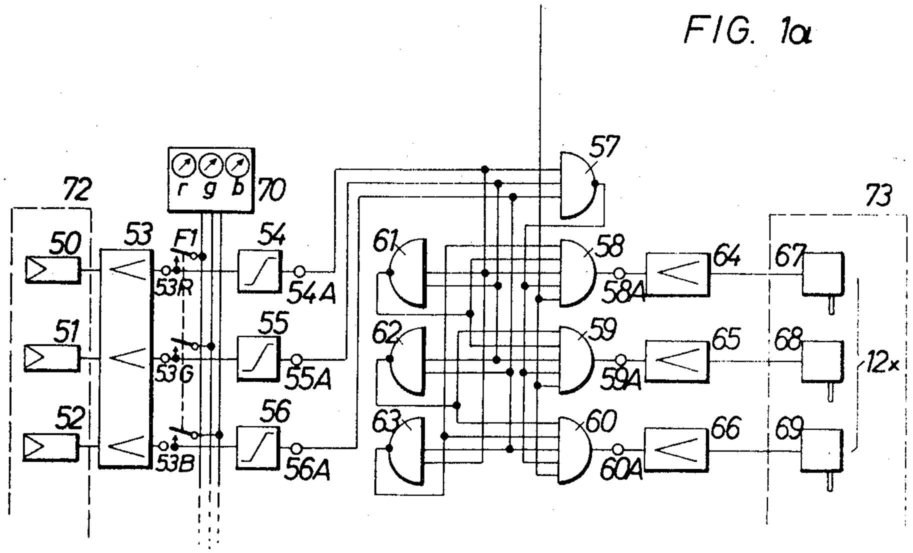
FIG. 1*a* is a schematic diagram showing the color scanning and color printing heads within the arrangement shown in FIG. 1.

For purposes of simplifying the arrangement for changing scales, the circuits X and Y in FIG. 1 are provided. When these circuits are in operation, the controlling functions applied by the electrical signals from the circuit are essentially maintained. In the uncontrolled transport direction, however, the circuits are disconnected and the counting operation is drastically shortened. Thus, in the control transport direction the process is carried out without any reduction, and the color printers are disconnected. If switch S is moved from its illustrated position, which corresponds to normal scanning, to the opposite position, the following are true:

1. The motion in the Y direction is discontinued as a result of disconnecting the output of the OR gate 28 from the second inputs of the AND gates 29 and 45.
2. The counter 36 is made non-operative through the disconnecting of the pulse shaper 34 from the stage C of the ring counter 18. In this manner, the electrical counter cycles of the transport mechanism during the transport control in the X direction, are not counted.
3. The second input to the AND gate 12 which is connected to the output A 23 of the counter 8 during normal pattern scanning, is switched to the output A1 of the counter 8. In this manner the counter 8 which usually counts to 23 for the second motion in the Y direction, counts now only to 1. As a result no delay appears in the subsequent motion in the X direction.

4. The operation of the color printer is in effect, since the connection from the output of the OR gate 20 is disconnected from the second input of the AND gate 26.
5. The signal of stage A or C of the ring counter 18 is disconnected, by way of the AND gate 20, to the first input of the AND gate 13. The second input of this AND gate is connected to the output AB of the counter 8. The output of the AND gate 13 is applied to the OR gate 33 by way of a closed contact on the switch X, and as a result a signal is applied to the "stop" input of the flip flop 4.

If now the "start" button is depressed, the movement in the X direction takes place of the amount, for example, 420 grid steps. The pulse output at the terminal AB of the counter 8, however, causes the disconnecting of the 670 KHz signal through the AND gate 3, without further advancing the ring counter 18 to the stage B and the resetting of the counter 8. The end position of the scanning head can now be precisely compared with the end marking provided on the pattern. The "start" button is then depressed, the control process continues including the pulse signals and switching operations for one grid step in the Y direction, but the grid step does not take place because the mechanism for motion in the Y direction is disconnected. The operation consumes only one-fifth of a second. The stage C of the ring counter is then actuated and controls the return path in the X direction. At the end of the process, the control operation and counting operation is again discontinued through the circuit elements 13, 33, 4 and 3. As a result, the scanning and color printing heads are again returned to their initial positions. Accordingly, an eventual predetermined deviation of the end position of the scanning head in relation to the end marking of the pattern, can be repeated. This is accomplished through changing the output A1 of the preset counter 37 and the control process described above.

If the scanning heads are again returned to their initial positions after the arrangement has been set in the X direction, the switch X is returned to the stage shown in the drawing. The switch Y, on the other hand, is turned to the state opposite to the one shown in the drawing. The state of the switch Y shown in the drawing corresponds to the normal scanning process. As a result, the following conditions prevail.

1. The transport mechanism in the X direction is disconnected by severing the output of the OR gate 20 from the second inputs of the AND gates 21 and 38.
2. The color printer is connected through the disconnecting of the output of the OR gate 20 from the second input of the AND gate 26.
3. The counting of the grid steps in the direction of the repetitive width as, for example, 420 grid steps, is reduced by one grid step. At the same time, the second inputs of the AND gates 9 and 11 are switched from the output AB of the counter 8 to the output A1. In this manner, only one grid step is counted in the X direction. However, the execution of this count in the X direction does not take place because the transport mechanism is disconnected. The process consumes only one-fifth of a second.

The computed and preset count at the counter 36, corresponding to the number of cycles of motion, functions through the circuit means only in the Y direction and practically without delay through the X transport mechanism. This operation continues until the last cycle when the counter 36 reaches the preset count through switching to the stage C of the ring counter 18. At this point the output AH produces a signal at the first input of the AND gate 32. After the first counting interval of the counter 8, the output A1 provides a signal to the second input of the AND gate 11, by way of the switch Y. The first input of the AND gate 11 has already been prepared at the proper level through the stage C of the ring counter 18. As a result, the advancing of the ring counter 18 and the resetting of the counter 8 are executed. The final switching off function is also performed through the circuit elements 32, 33, 4 and 3. The end position of the scanning head can thus be precisely compared with the end marking on the pattern. The counter 36 can then be reset to its zero position or state by depressing the reset button 0. The direction of rotation switch for the Y axis is also switched from the position YV to the position YR, and the "start" button is depressed. Now the scanning head 72 and the color printing head 72 return to their initial positions and the rotational direction switch UV is returned to the position YV. The reset button 0 is also depressed. An eventual predetermined deviation of the scanning head of its end position with respect to the end marking on the pattern can now be executed through changing of the output A2 of the counter 37. The aforementioned control process for the new position can also be repeated.

If, in this manner, motion is executed in the Y direction and the scanning heads are again returned to their initial positions, then the switch Y is returned to the position shown in the drawing. At the same time, the direction of rotation switch is returned to the position YV and the reset button 0 is depressed. The process for scanning the pattern and printing out the results can now again be initiated through renewed depressing of the start button.

The counter 37 receives always a reset pulse through the OR gate 43, the monostable multivibrator 44 and the OR gate 71, when either the output A1 transmits a signal to the input of the OR gate 43, by way of the AND gate 38, or the output A2 by way of the AND gate 45. The output A1 is emitted when the preset count has been attained.

Three photodiodes or phototransistors 50, 51 and 52 are provided for each of 12 lines to be scanned by the color scanning head 72. As a result of the presence of color filters, only one of the three colors, red, green, and blue can be received.

The signals transmitted by the phototransistors per line, are amplified in an amplifier 53 having three channels. The amplifier provides uniform amplification to all three color channels. Variations due to scanning illumination or the separation of the scanning head from the drawing or pattern being scanned are also smoothed out. Such variations may also be contained in the absorptions or reflections of the scanned colors. The smoothing effect is applied to the color channel with the largest signal output for full signal control. The signal of this color channel serves as 100 percent comparison value for both of the other color channels. The signal is also used to actuate the Schmidt triggers 54, 55, or 56 which are designed to switch when the applied signal exceeds 70 percent. If the signals of all three color channels exceed this 70 percent limit, then "white" is designated and the gate network with the AND gates 58, 59 and 60 as well as the NOT gates 57, 61, 62 and 63 do not provide any signal at any of their three outputs 58*a*, 59*a* and 60*a*.

If the signals of two color channels remain under the 70 percent limit, the signal for 100 percent control is the one used. The gate network then provides a signal at the output corresponding to the designated color. The signal is amplified in the power amplifier 64, 65, or 66 and printed out by the associated color printer 67, 68 or 69. This is accomplished as soon as the pulse signal from the monostable multivibrator 27 is applied to the first inputs of the three AND gates 58, 59 and 60. If still another channel exceeds the 70 percent limit other than the one having the 100 percent control, the gate network is cut off and does not provide a signal at any one of its three outputs. Thus, no color is printed and the white remaining grid point on the grid pattern or drawing can be manually corrected by applying the proper color.

If none of these three channels achieves the aforementioned lower limit, then the designation "black" is applied and no signal is emitted at any of the three outputs of the gate network. This is because black is not provided as a color in the pattern.

Figure 3:
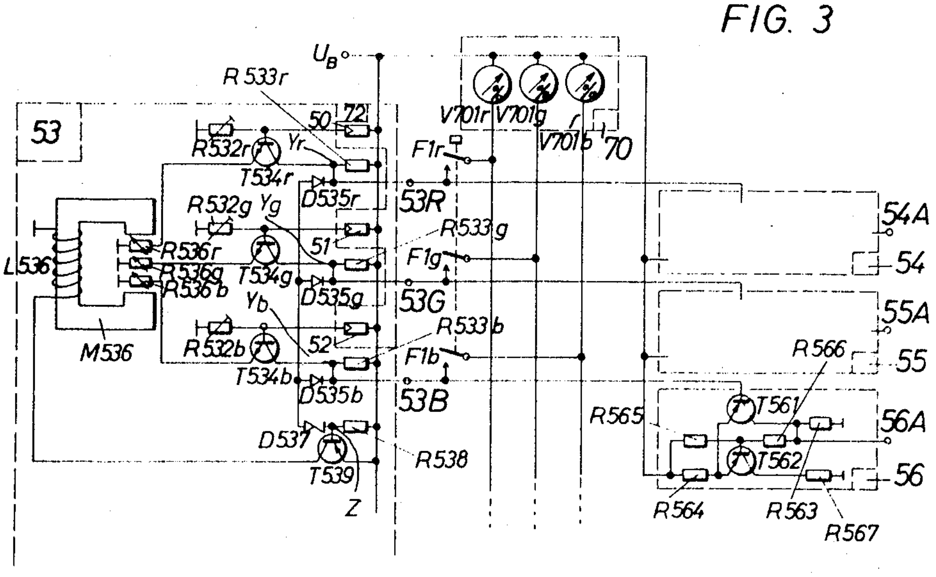
FIG. 3 is a schematic diagram of one embodiment for sensing a four color pattern.

The sensitivity of the photodiodes may be adjusted through the variable resistors R 532, *r*, *g*, and *b*, shown in FIG. 3, and the measurement control 70. The latter has three indicating instruments *r*, *g* and *b* corresponding to each one of the three color channels. In this manner 100 percent control for all three channels while scanning the white paper of the pattern can be realized. This is the case when the paper has a particularly weak color impression. The measuring arrangement 70 can be connected to the three channels of the first scanning line through the pushbutton F1. With the further eleven pushbuttons F2 to F12, not shown, the three channels are adapted to the scanning lines 2 to 12. These pushbuttons are mechanically ganged.

Figure 4:
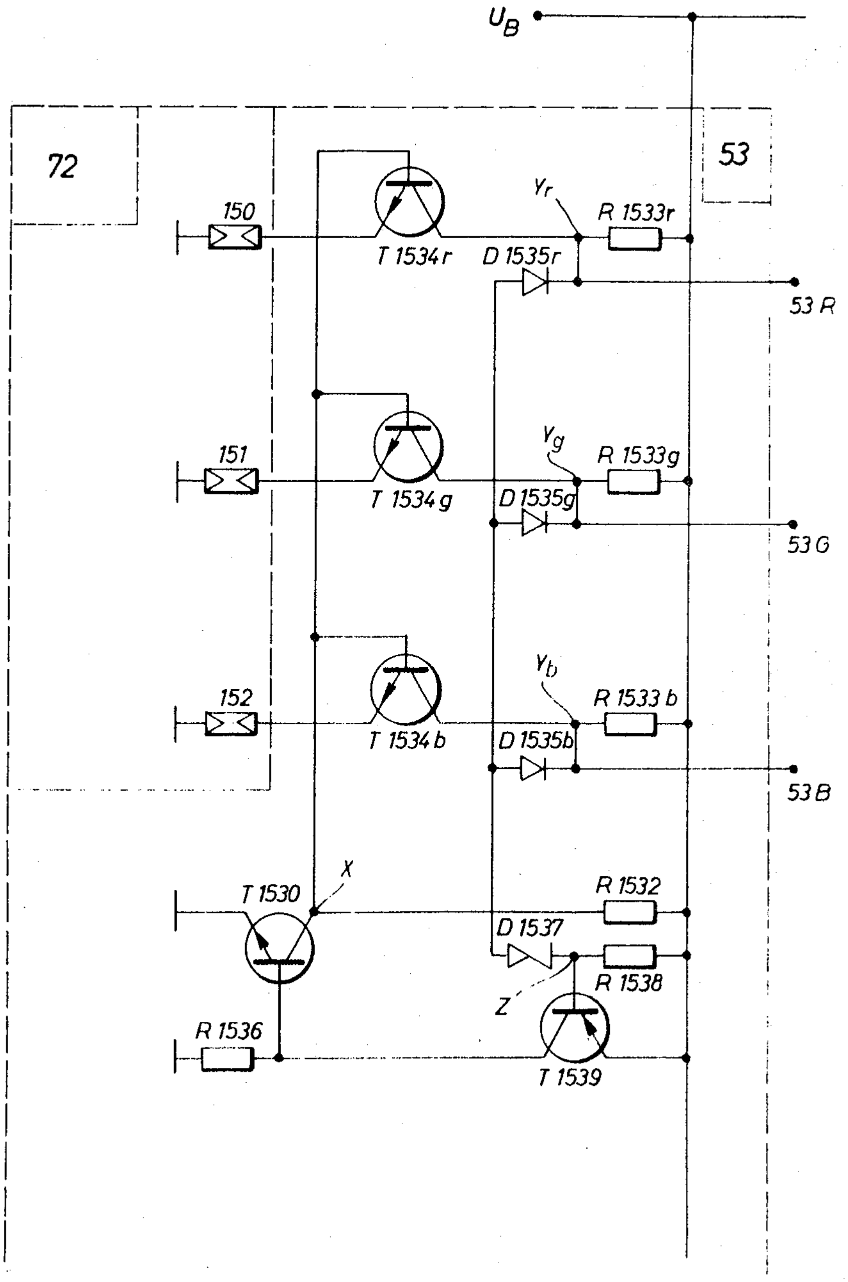
FIG. 4 is a schematic diagram of a second embodiment for sensing a four color pattern.

As examples for the color recognition circuits of the present invention, two embodiments are described: Two embodiments of the color recognition circuit are shown in FIGS. 3 and 4. With this arrangement the following is being achieved:

The degree of amplification of each of the amplifier channels following the photosensors 50, 51 and 52 is regulated as a function of the output voltage of the respective amplifier channel. The regulation is performed on the basis of the largest voltage level of the output. The regulation is such that a predetermined value is maintained from the least possible brightness of the associated photosensor to all larger values of brightness from the respective photosensor. The arrangement is such that the output voltage of the remaining amplifiers is proportional to the relationship of the brightness of the remaining photosensors to the brightness of the photosensors with the maximum brightness. As a result, a base or standard for the color portion of the respective color is in percentage relationship to the main color and is independent of the brightness and reflection of the color scanned.

In this regard the circuits of FIGS. 3 and 4 are useful. In the circuit of FIG. 3 each of the photodiodes or phototransistors 50, 51 and 52 are connected in series with a resistor R 532, *r*, *g*, *b*, and also to the common voltage level UB. The photosensors further are connected to resistors 533 *r*, *g*, *b* leading to the collectors of the transistors T 534 *r*, *g*, and *b*. Connected between the emitters of these transistors and ground are variable resistors R 536 *r*, *g*, *b*. Variable resistors R 532 *r*, *g*,, and *b* are connected between the bases of the transistors and ground. The amplified voltage appears at the collector resistors R 533 *r*, *g*, and *b*, and is applied to the following Schmidth trigger circuits 54, 55 and 56. The emitter resistors R 536 *r*, *g*, *b* are sensitive to magnetic field flux and are situated within the air gap of an electromagnet M 536. The coil of the electromagnet is excited through a further transistor T 539 whose emitter is connected to the voltage level UB. The base of this transistor is connected, through the Zener diode D 537 to the output of an OR gate D 535 *r*, *g*, and *b*.

The inputs of these OR gates are connected to the resistors R 533 *r*, *b*, *g* of the transistor amplifier.

The circuit shown in FIG. 3 operates in the following manner.

If the photosensitive transducers 50, 51 and 52 are illuminated very faintly or not at all, as is the case when the point scanned has the color black, the three amplifying transistors T 534 have a maximum amplification factor, since the transistor T 539 is cut off and, consequently, the three magnetic field sensitive resistors R 536 have their smallest resistance value. The junction points Y between the collector resistors R 536 and the diodes D535 and the junction Z between the Zener diode D 537 and the resistor R 538 are both approximately at the potential $U_b$ of the voltage source.

If, for example, the voltage at only one of the junctions Y should decline, because of increased illumination of the corresponding photosensitive transducer, the fall in this voltage will, at first, have no effect on the voltage at junction Z, which is determined by the current limited by the Zener diode D 537. If the voltage at the particular junction Y becomes so great that the voltage at the Zener diode D 537 exceeds the Zener voltage, the voltage at the junction Z begins to fall with respect to the voltage $U_b$, and the transistor T 539 is turned on. In dependence on the degree of illumination of the photosensitive transducer under consideration there flows, once the Zener voltage is exceeded, through the winding L 536 a current that increases the resistances of the magnetic field sensitive resistors R 536, thereby reducing the amplification factors of all of the transistors T 534 to a like degree. By correctly choosing the values of the components of the circuit, the current through the winding L 536 is always of just such a magnitude that a voltage at the particular junction Y is equal, except for a small deviation, to the Zener voltage of the Zener diode D 537. Thus, if only one photosensitive transducer is illuminated, the voltage at the corresponding junction Y is held constant for any brightness of illumination, once the Zener voltage is reached. This constant voltage is used as the reference standard, and by definition is called the 100 percent value.

If several of the photosensitive transducers 50, 51 and 52 are illuminated, the value of the magnetic field sensitive resistors R 536 and therefore the amplification factor of the transistors T 534 always depend on that photosensitive transducer that is most strongly illuminated. This fact results from the OR gate, of which only that diode D 535 conducts that is subjected to the largest voltage.

The amplification factors of all of the transistors T 534 are equal or substantially equal, since these transistors are of the same kind and the values of all of the magnetic field sensitive resistors R 536 are changed to the same extent. Consequently, the potential at the junction Y of the photosensitive transducer mostly illuminated corresponds to the value of 100 percent, whereas potentials at the other junctions Y are an indication of the ratio of the intensity of the illumination incident on their respective photosensitive transducers to the intensity of the illumination incident on the photosensitive transducer most strongly illuminated.

The other embodiment of the color recognition circuit is shown in FIG. 4. A plurality of photosensitive resistors 150, 151 and 152 are connected between ground and the emitters of transistors 1534 *r*, *g*, and *b*. The photosensitive resistors are provided with filters for the different colors to be detected. Resistors R 1533 *r*, *g*, *b* are connected between the collectors of these transistors and the voltage level UB. The amplified voltage is led to the Schmidt trigger circuits 54, 55 and 56 shown in FIG. 1. The bases of the transistor amplifiers T 1534 *r*, *g*, *b* are connected to a tap of a voltage divider. This voltage divider consists of a resistor R 1532 connected on one hand to the voltage level UB and, on the other hand, to the collector of a transistor T 1530. The emitter of this transistor is connected to ground, whereas the base of the transistor is connected to the resistor R 1536 and the collector of another transistor T 1539. The conductivity type of the transistor T 1539 is opposite to the transistor T 1530. The emitter of the transistor T 1539 is connected to the voltage level UB. The base of a transistor T 1539 is connected, by way of the Zener diode D 1537, to the inputs of the OR gates D 1535 *r*, *g*, and *b*. The outputs of the OR gates are connected to the resistors R 1533 *r*, *g*, and *b* which are the collector resistors of the transistor amplifiers T 1534 *r*, *g*, and *b*.

The circuit shown in FIG. 4 operates in the following manner.

If the illumination of the photosensitive transducers 150, 151 and 152 is weak or absent, as is the case if the point sensed is black in color, the bases, or junction X and the collectors or junctions Y of the amplifying transistors T 1534 are approximately at the potential of the voltage source $U_b$ and therefore at potential not equal to the breakdown voltage of the Zener diode Z 1537. Consequently, the junction Z between the Zener diode D 1537 and the resistor R 1538 is also approximately at the voltage of the source $U_b$ so that the transistors T 1539 and T 1530 are shut off. As in the previous embodiment, Zener voltage is reached only at a definite degree of illumination of one of the photosensitive transducers.

Once this degree of illumination is at least reached, the transistors T 1539 and T 1530 are turned on; and the voltage at the junction Z, and thus the voltage at the basis of the transistors T 1534, falls. The consequent reduction in the amplification factors of these latter transistors causes a voltage at the junction Y of the photosensitive transducer most strongly illuminated to equal approximately the Zener voltage. All other junctions Y are at a lower voltage, which indicates the ratio between the illumination of the corresponding photosensitive transducers and the photosensitive transducer most strongly illuminated.

Of the Schmidt triggers 54, 55, and 56, shown in FIG. 3, only the circuit 56 is shown in detail. The circuit arrangement conforms to the conventional design. When the input voltage to the base of the transistor T 561 is either larger or smaller than 70 percent of the predetermined level established by the Zener diode D 537 of the largest voltage output of the transistor amplifier, the trigger action prevails. The output of a Schmidt trigger circuit 56 is taken at the output terminal 56A corresponding to the collector of the transistor T 561. The output at the terminal 56A is led to the gate network having the circuit elements 57 to 63. The Schmidt triggers 54 and 55 are precisely constructed as the 56 circuit. The output terminals from the circuits 54 and 55 are, respectively, 54A and 55A.

The light reflected from any particular scanned location of the pattern must be transmitted to the three color filters provided with the photodiodes 50, 51 and 52, so that each of the three diodes receives its light from the same surface opening as the others. A distribution of the light can be accomplished through partially transmitting mirrors or through branches of light conducting rods. In this arrangement the rods of each branch are statistically distributed at the junction. It is also possible to use a light conducting rod for each of the three diodes. In this design the remote ends of the light rods with respect to the photodiodes, are arranged so that they receive the light from the further light rod. This light received by the further light rod arises at the other end either directly or indirectly from the location of the pattern being scanned. It is also possible to provide each one of the three photodiodes with an individual projection system each of which is directed on the precise same location on the pattern being scanned.

Figure 2:
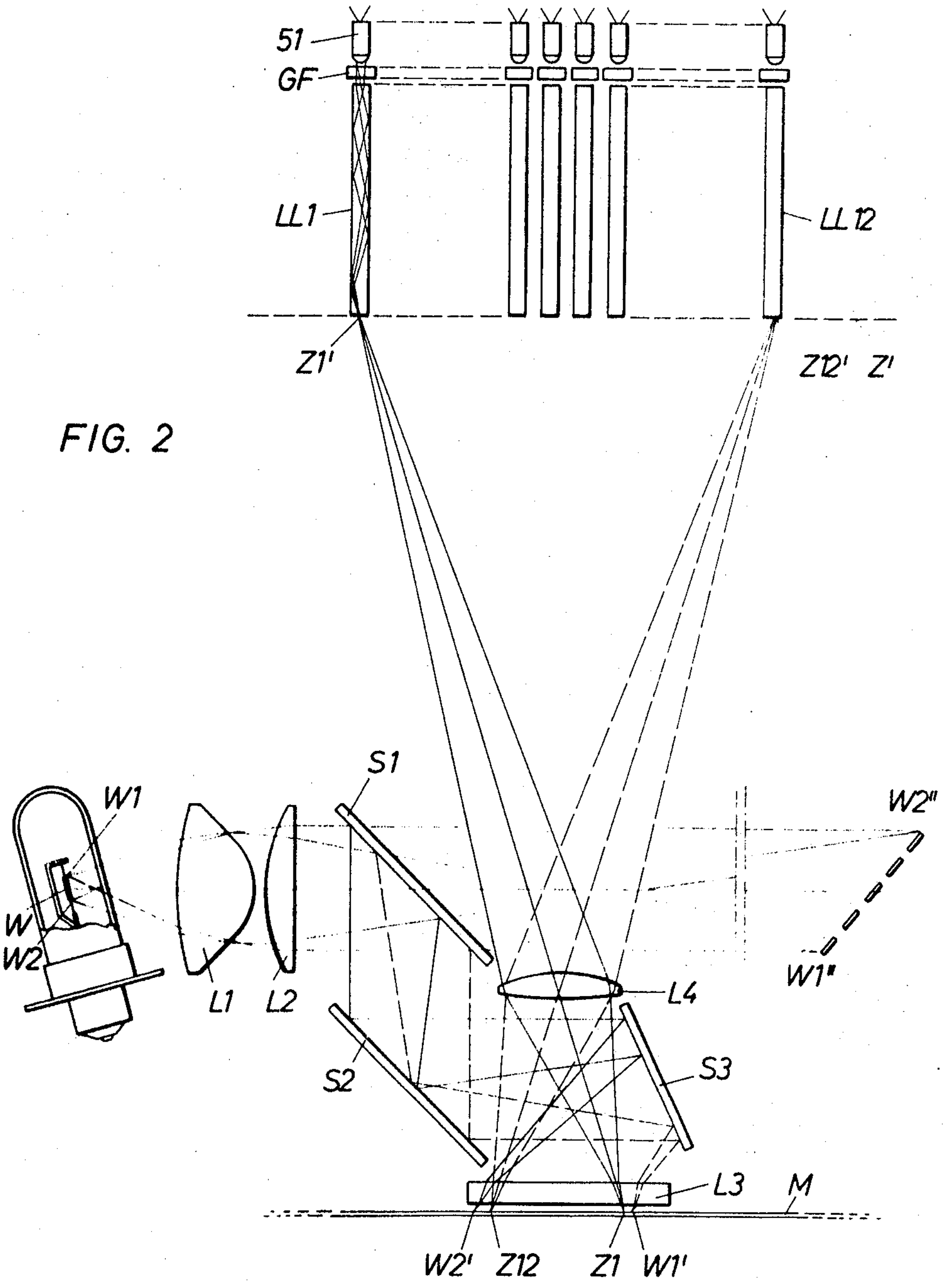
FIG. 2 schematically shows the scanning heads.
Figure 2A:
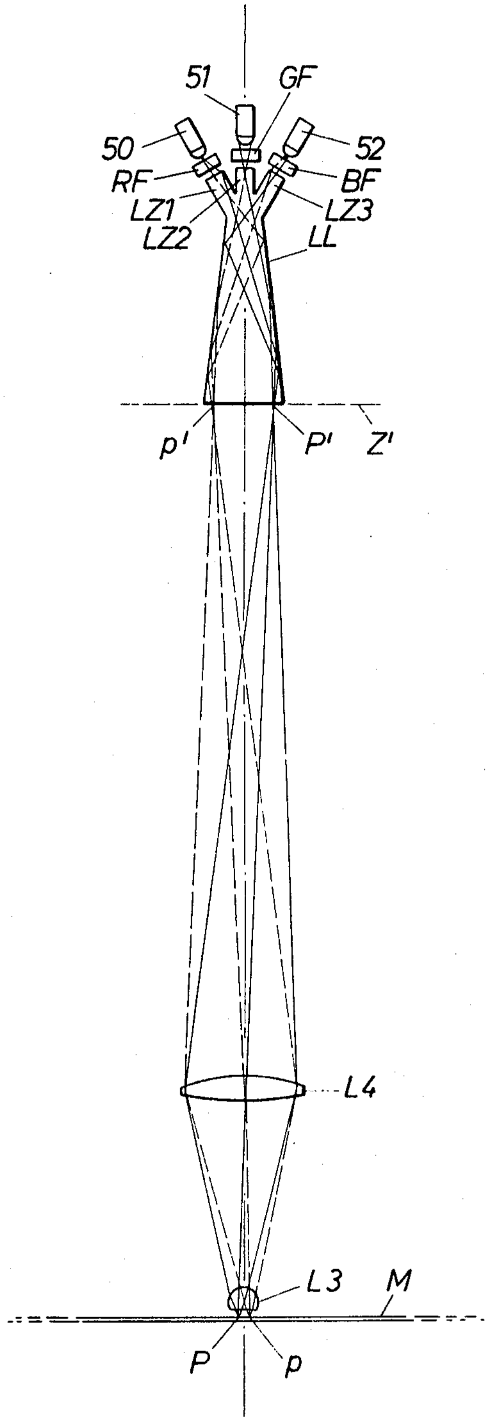
FIG. 2*a* is a view at right angle to the view shown in FIG. 2.

The optical arrangement of the scanning head may be described with regard to FIGS. 2 and 2*a*. The illuminating member of a projection lamp is in the form of a thin but long filament W having upper and lower ends W1 and W2, respectively. Exterior to the projection lamp in a nonspherical condensing lens L1 and a planoconvex spherical lens L2. The image of the filament within the projection lamp is projected through these lenses L1 and L2 and upon the pattern M being scanned, through the use of the deflecting mirrors S1, S2 and S3. These mirrors are of the planar type. As a result, the filament end W1 is projected to the point or location W1′ on the pattern M, whereas the filament end W2 is projected to the location W2′. A rod-shaped cylindrical lens L3 lies longitudinally along the direction of the filament image, and in close proximity to the upper surface of the pattern. In this manner, the light from the filament W is projected in an extremely narrow line upon the pattern and transverse to the direction of the line scanning. The light emerging from the cylindrical lens L3 is regulated and chosen so that only the diffused reflected light from the pattern being scanned enters the color scanning equipment. In this manner, the glare of a color pattern is not mistaken for "white."

In the preceding arrangement the impinging light is at an inclined angle and as a result the image W2′ of the filement end W2 is separated further by the lens system L1 and L2, than is the image W1′ of the filament end W1. The axis of the projection lamp and hence the filament axis are, therefore, positioned in an inclined manner, so that the image of the filament between the points W1′ and W2′ incurs little variation in width and remains sharp.

In FIG. 2 the light beam from the illuminating optical system is constructed of two dashed lines emerging from the filament end W1, and two solid lines emerging from the filament end W2. These dashed and solid lines impinge upon the pattern M to project the images of the filament ends W1′ and W2′ respectively. Since this geometrically constructed beam is difficult to view as a result of the three deflections incurred by the mirrors, this beam is also constructed in the same Figure under the assumption that the mirror S1 and the cylindrical lens L3 are omitted. The two dashed lines emerging from the filament end W1 are therefore projected to the point W1″, and the two solid lines emerging from the filament end W2 are projected to the point W2″. The filament is shown by the double dashed line drawn between the locations W1″ and W2″.

Through the motion of the scanning head in the X direction, the pattern is scanned in a strip having a width of 12 lines. Through the illuminating optical system the line between points W1′ and W2′ and transverse to the direction of line scanning, is subdivided into twelve sections. Each section corresponds to a single line width and, accordingly, the point Z1 on the pattern M represents the first line of the scanned pattern. The point Z12, similarly, represents the twelfth line of the scanned pattern. Between these two extreme points lie the other ten lines, not shown in the drawing for purposes of clarity.

By means of the lens L4, the point Z1 is projected in the plane Z′ at point Z1′. This latter location represents the entrance surface or entrance end of a light-conducting element LL1. The projection of the point Z1′ is constructed with three solid lines.

Upon entering the light-conducting element, the light rays are interrupted only slightly, and they emerge from the light-conducting element after a number of total reflection processes along the side surfaces of the conducting element. The light rays at the exit of the light-conducting rod are, however, now very uniformly distributed. After passing through the green color filter glass GF, the light rays impinge upon the photodiode 51. The same conditions prevail with respect to the point Z12. An image of this point is formed at the location Z12′ in the plane Z′. This point Z12′ coincides with the entrance surface or end of the light-conductor LL12. In the manner similar to that described in relation to the light conductor LL1, the light ray passes through the light conductor LL12 and reaches the respective photodiode after passing through the associated filter. The cylindrical lens L3 has no noticeable effect upon the ray of light along its longitudinal direction represented in FIG. 2.

The patterns to be scanned may be drawn to different scales. These scales are then to be converted to the predetermined uniform scale of the grid pattern. Since the light-conducting elements LL1 to LL12 and their associated color filters and photo-diodes are provided with firmly fixed separating distances, the magnification of the scanning optical system is made adjustable. Such adjustment is made possible by providing that the lens L4 is constructed in the form of a zoom lens. The same results can also be achieved when the lens L4 has a fixed focal length and the distances between the lens L4 and the planes M and Z′ are made variable, as in the conventional enlarging apparatus.

In FIG. 2 the optical scanning system is shown in the direction of line scanning. FIG. 2*a*, however, is drawn from the view of the transverse direction to the line scanning. The plane of the drawing in FIG. 2*a* intersects, therefore, the pattern M along a line. The illuminating arrangement in this configuration has been omitted.

The points P and *p* lie on a line within the very narrow illuminated strip in the illuminating direction and along the longitudinal direction of the cylindrical lens L3. For purposes of clarity, a large amount of separation is shown in the drawing between these two points. The cross-sectional view of the cylindrical lens L3 is shown in FIG. 2*a*. The distance of separation between the cylindrical lens and the pattern M is somewhat smaller than its focal length. In this manner the severely diverging light ray originating from a point on the pattern, is only diverged a small amount further after passage through the lens L3. As a result, a larger proportion reaches the lens L4. The three solid rays originating from the point P in FIG. 2*a*, are concentrated by the lenses L3 and L4 and brought together in the plane Z'. Thus, the point P' represents the image at the entrance of the light conductor LL of the point P. The rays passing through the light-conducting rod LL experience a number of total reflections and are then distributed through the three branches LZ1, LZ2 and LZ3. The distribution of these branches of the light conductor is uniform. After passing through the three light-conducting branches at the narrow end of the light-conducting rod LL, the light rays pass through the respective filters RF, GF and BF, designated for the red, green and blue filters, respectively. Upon emerging from these filters, the light rays impinge upon the respective photodiodes 50, 51 and 52. The geometrical path for the light beam associated with the point *p* is similarly represented through three dashed lines. Analogous construction may be performed for all points lying between the extremes P and *p* on the pattern M. Furthermore, the distribution of the light rays within this short line section is made uniform along the three color filters provided with the photodiodes. When scanning a color border between two patterns or designs, therefore, the switching of the color recognition and shaping circuits are not made dependent upon the spatial arrangement of the photodiodes, but only upon the magnitude of the photocurrent of one or the other diode in relation to each other.

Figure 5:
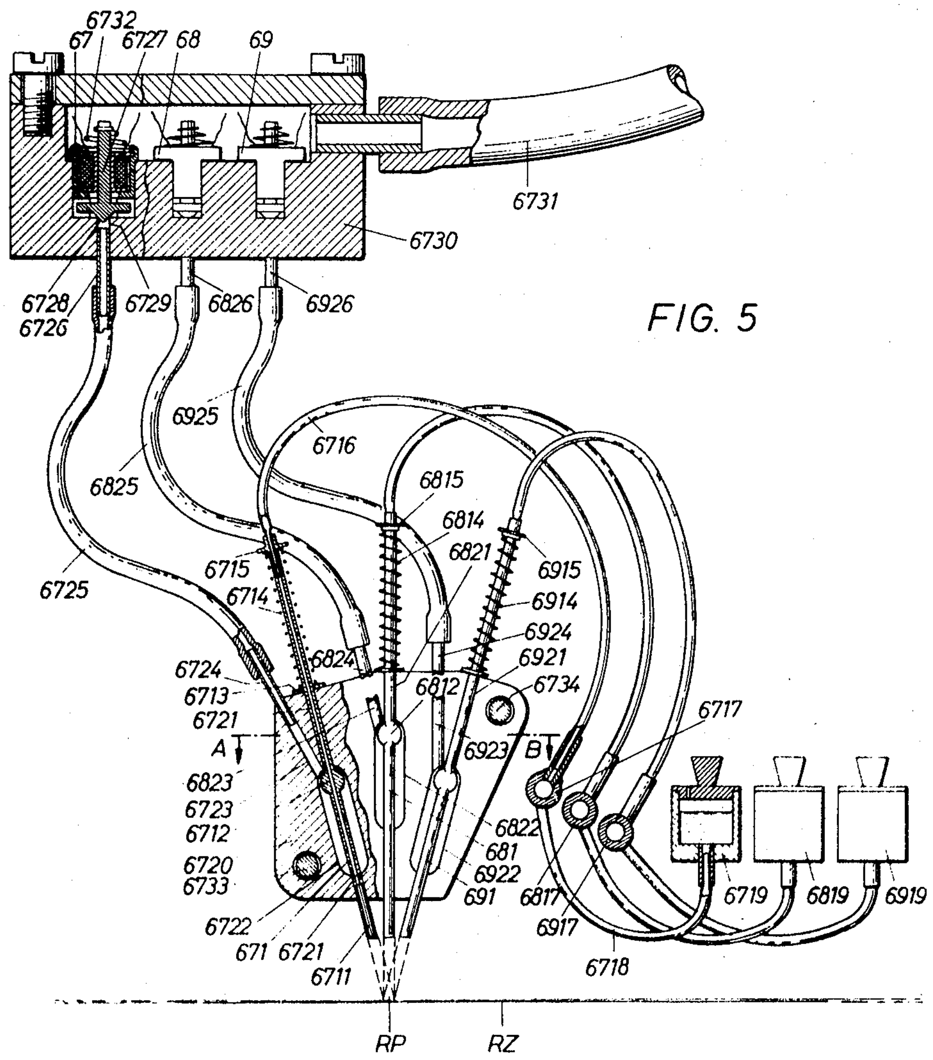
FIG. 5 is a side view, in cross section, showing the construction of the printing head of the invention.
Figure 6:
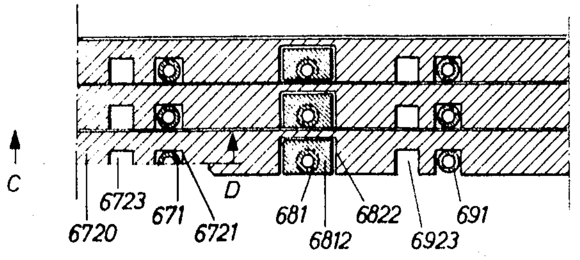
FIG. 6 is a view in cross section taken along line A—B of FIG. 5.
Figure 7:
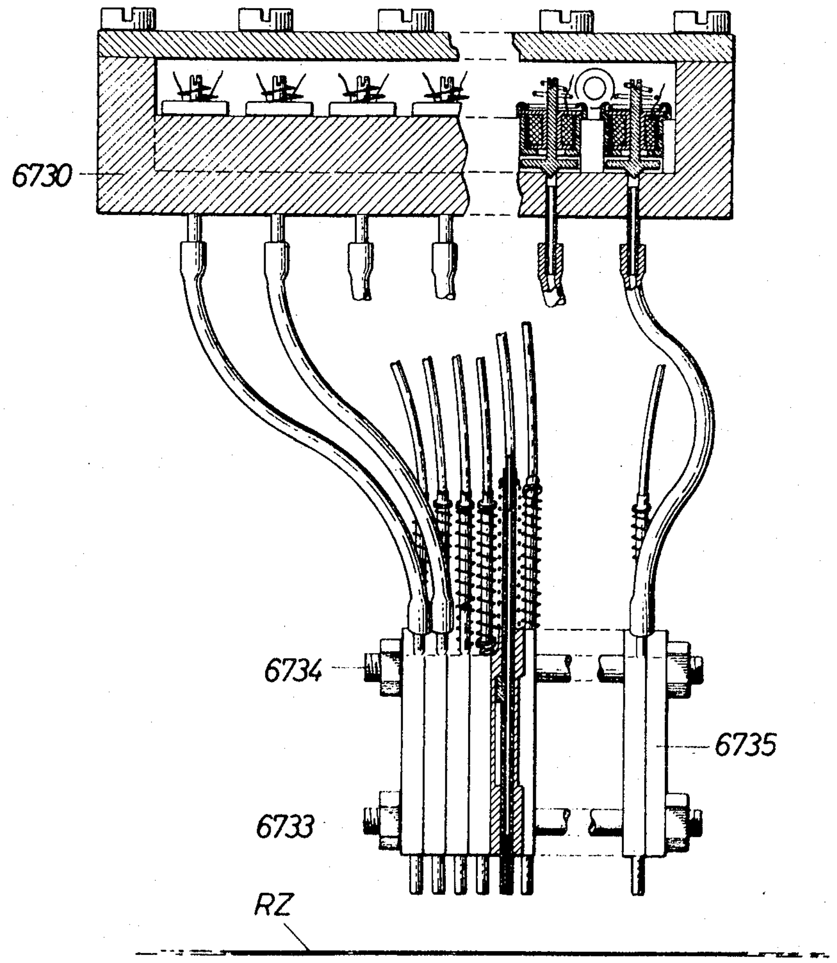
FIG. 7 is a side view, in cross section of the printing head shown in FIG. 5.

An example of the construction of the color printing head is shown in FIGS. 5, 6 and 7. FIG. 5 represents the plan view of a pneumatically actuated color printing element. The view shows a partial cross section parallel to the plane of the layer (cross-hatched) and a section transverse through the valve housing. FIG. 6 shows a cross-sectional view through the color printing elements lying in layers on top of each other, and parallel to the plane of the grid drawing. The cross-sectional view is taken in the plane designated by the line A–B in FIG. 5. FIG. 7 shows the view of the color printing head in the line direction. The view omits partially a number of color printing elements and is taken longitudinally through the valve housing.

The color printing member 671 is shown in cross section in FIG. 5. This color printing element consists of a thin tube into which is inserted, at its lower end, the scribing or recording member 6711. The latter is constructed in the form of a felt scriber or recorder. Color fluid is transmitted to the scriber or recorder by means of the bore within the tube as well as a flexible tube 6716 secured to the rigid tube. The flexible tubing is coupled to a distributor 6717 which leads to a reservoir 6719, by way of the flexible tubing 6718.

The color printing member 671 lies within a plate 6720, and may be easily shifted along its axial direction through the notch 6721 milled into the plate 6720. Thus, the color printing member 671 is movable in relation to the grid point RP on the grid of the printed drawing paper or recording paper RZ. The milled notch or slot 6721 communicates with a longitudinal space 6722 which extends the cross section of the slot in both width and depth and serves the function of a cylinder. The member 6712 functions as the piston within the cylinder. The member 6712 is secured to the color printing member 671. The piston 6712 fits securely and without much play, within the cylinder space 6722 having a rectangular cross section. As a result of the return spring 6714 held between the flange 6715 at the upper part of the color printing member 671 and the plate 6720, the piston 6712 is held against the upper portion of the longitudinal space 6722. Thus, the upper surface of the space 6722 serves as a limiting means for the movement of the piston. At the upper portion of the longitudinal space 6722 is also a communicating notch 6723 milled into the plate 6720. At the upper end of the notch 6723 leading towards the rim of the plate 6720, a short rigid tube 6724 is braced or soldered into the notch. The notch 6723 and the longitudinal space 6722 are fully sealed. This condition prevails in a similar manner with respect to the notches 6821, 6921, 6823, and 6923 applying to The color printing members 681 and 691, respectively. The three color printing members 671, 681 and 691 form the color printing elements in the plate.

If, now, pressurized air is introduced into the tube 6724, then the air becomes transmitted between the upper end of the longitudinal space 6722 and the piston 6712, by means of the notch 6723. As a result, the piston head 6712 and the connected color printing member 671 become pressed downward. This downward pressure is exerted until the color printing member contacts the recording paper RZ with its felt recording element. Since the latter is soaked with color fluid, a color point becomes printed. A seal between the rectangular shaped notch 6721 and the round tube within this notch is obtained through the sealing disc 6713 which is pressed upon the opening through the return spring 6714. As soon as the air pressure is released, the return spring 6714 also returns the color printing member 671 to its initial or starting position.

The control of the pressurized air for the color printing member 671 is realized through the electromagnetic valve 67. The electromagnetic coil of the valve 67 is connected to the power amplifier 64 previously described with regard to the color shaping circuitry in FIG. 1. The electromagnetic valve is seated within a sealed housing 6730. The housing is continuously subjected to pressurized air by means of the tube 6731. The armature 6727 of the electromagnetic valve 67 causes the bore 6729 to be closed, when in its non-operating position. This valve action is achieved through the pressure exerted by a spiral spring 6732 upon the armature, and the needle valve 6728. Within the bore 6729, a short rigid tubing 6726 is brazed or soldered. A flexible tube 6725 connects this soldered-in or brazed-in tube 6726 with the tube 6724, similarly soldered into the notch 6723 of the plate 6720. If the power amplifier 64 applies current to the electromagnet 67, the armature 6727 becomes actuated and the needle valve 6728 opens the bore 6729. In this manner the pressurized air from the housing 6730 can drive or actuate the color printing member.

If the color printing member 671 is provided with red colored fluid from the reservoir 6719, then the color printing member 681 is supplied with green colored fluid from the reservoir 6819. In a similar manner, the color printing member 691 is then supplied with blue colored fluid from the reservoir 6919. Accordingly, the control of the color printing members 681 and 691 is similar to that described in relation to the color printing member 671. Such control action takes place through the notches 6823 and 6923, tubes 6824 and 6924, flexible hose or tubing 6825 and 6925, and the rigid tube sections 6826 and 6926 of the magnetic valves 68 and 69, respectively.

For the arrangement described above, twelve such color printing elements are provided. These are maintained in a row by means of the bolts 6733 and 6734. FIG. 6 shows a number of such color printing elements in a row along a cross-sectional plane denoted by the letters A and B in FIG. 5. This view shows the cross section of a number of notches of the color printing members as well as the piston head 6812 of the color printing member 681, when operating longitudinally in the cylinder space 6822 having a rectangular cross section. The partial cross section of the plate 6720 in FIG. 5 is designated by the dash-dot line between C and D in FIG. 6.

FIG. 7 shows a view of the color printing elements situated in a row and held in place by the bolts 6733 and 6734. These color printing elements are part of the color printing head and are situated in sequence in the direction of line motion of the color printing head, corresponding to the X direction. The view also includes a cross section through the magnetic valve housing 6730. The left portion of the cross section lies in front of the magnetic valves, corresponding to the valves 67 shown in FIG. 5. The right-hand portion of the cross section passes through the row of magnetic valves. From left to right in FIG. 7, two color printing elements are completely shown from their end view.

The pressurized hoses emerging at the top correspond to the hose 6725 in FIG. 5. The elements appearing behind and below the color printing elements emerging from the color printing members with their return springs, correspond to the parts 671 and 6714 in FIG. 5.

The pressurized hose corresponding to the part 6725 is omitted for the third color printing element. For the fourth color printing element the rigid tube section corresponding to part 6724 is also omitted. The fifth color printing element is shown in the cross section longitudinal to the axis of the middle color printing member corresponding to the member 681. Accordingly, it is possible to recognize in the view the piston head 6812 and the longitudinal space 6822 connecting to the rigid tube section of the color printing member.

The sixth color printing element is shown in the same cross section with the exception that the middle color printing member corresponding to the member 681 is removed. As a result, only the sides of the color printing parts corresponding to 691, 6914, and 6915 are visible. At the extreme right, an end plate 6735 is located for the sole purpose of taking the place of the last color printing element.

The colored fluid reservoirs 6719, 6819 and 6919, as well as the colored fluid distributors 6717, 6817 and 6917 are not shown in FIG. 7. The hoses leading to the colored fluid distributor 617, the first four and the last color printing element, as well as the hose leading to the element 6817, are shown broken off or partially. This same condition prevails for the hose leading to the part 6917 of the color printing member corresponding to 691 of the sixth color printing element. The mounting arrangement of the color printing head upon the plotter carriage has also been omitted.

Figure 8:
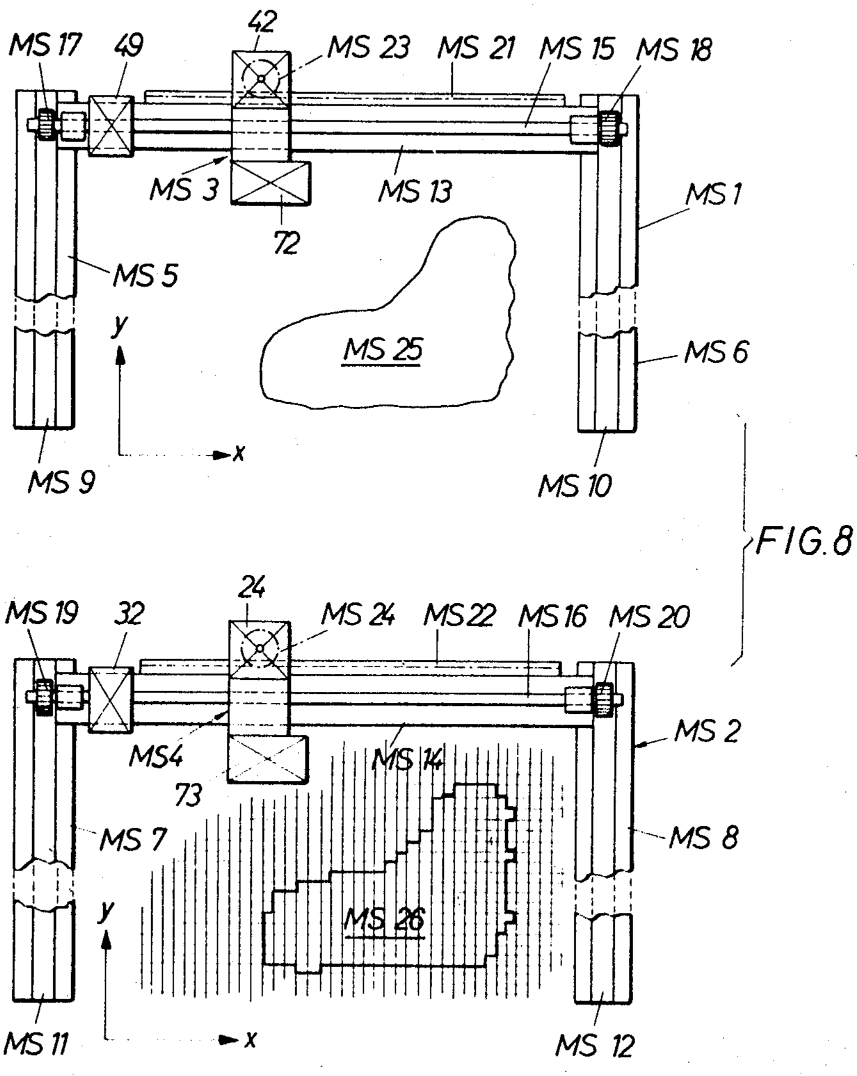
FIG. 8 is a plan view of the coordinatographs used in the invention.

The two plotters MS1 and MS2 shown in FIG. 8, are of identical construction. The two plotters differ from each other only in the respect that one carries the scanning head 72 on its carriage MS3, whereas the other has the color printing head 73 mounted on its carriage MS4. On one or two separate and independent suction tables are two tracks MS5 and MS6, as well as the tracks MS7 and MS8. These tracks are firmly secured in place and are parallel to each other along the direction. The distance between both tracks determines the width of the pattern to be scanned or the paper to be printed. The length of the tracks, on the other hand, determines the length of the pattern to be scanned or the paper to be printed. Upon each of the tracks is a gear rack MS9, MS10, MS11 and MS12. At right angles to both tracks straddles a cross member MS13 which is movable on both tracks along the Y axis.

Upon each such cross member is a step motor 49 or 32. These step motors drive the shafts MS15 and MS16 passing therethrough. These shafts are rotatably mounted upon the cross members but are prevented from moving axially therealong. At each end of the shaft is a translating device arranged on the cross member. This device has a pinion meshing with the gear racks MS9, MS10, MS11 and MS12 for purposes of clarity, intermediate gears are not shown in the drawing. Only the gears MS17 and MS18, as well as MS19 and MS20 on the ends of the shafts are shown.

If the step motors 49 and 32 are energized, the cross or bridge members MS13 and MS14 move in a stepwise manner in one or the other direction of the Y axis. Upon the cross or bridge members MS13 and MS14, are carriages MS3 and MS4, respectively. These carriages are displaceable along the X axis. Upon each carriage is mounted a step motor 42 or 24 mechanically linked to a gear rack MS21 or MS22, respectively. The intermediate transmission gearing whereby the step motors are linked to the gear racks are not shown for purposes of clarity. Each of these gear racks is securely fixed or mounted to a side edge of the respective bridge or cross member. Again, for purposes of clarity, only one pinion is shown secured to the shaft of the step motors and in mesh with the teeth of the gear rack. These pinions represented by MS23 and MS24 may be linked mechanically to the gear racks through additional intermediate gears.

The scanning head 72 is mounted upon the carriage MS3. The sensing part of the scanning head 72 is directed toward the pattern or drawing to be scanned. The color printing head 73 is mounted upon the carriage MS4. The operating side or part of this color printing head 73 is directed against the recording paper.

Upon the surface or table of the plotting machine MS1, is, for example, the drawing or pattern MS25 shown as having an irregular outline. This pattern or drawing MS25 is read by the scanning head 72 through a stepwise motion in both the X and Y directions. The read-out signals are transmitted to the color printing head 73 which moves synchronously in relation to the scanning head 72. For every grid point that is scanned or read, the color printing head 73 prints a corresponding point on the recording paper. The printed figure MS26 shows that as a result of the grid arrangement, the curves of the pattern MS25, are translated into a step-shaped contour upon the recording paper.

The voltage source and the electrical connection to the step motors, as well as the scanning head and printing head, are not shown in the drawing. These connections appear on the wiring circuit diagrams associated with this equipment.

It will be understood that each of the elements or steps described above, or two or more together, may also find a useful application in other types of color scanning and sensing arrangements differing from the types described above.

While the invention has been illustrated and described as embodied in a method and apparatus for scanning and sensing color patterns, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method for scanning and sensing colored patterns, including the steps of optically scanning the pattern point-by-point; sensing the color of each point by sensing a plurality of spectral ranges; producing for each spectral range an electrical signal of which the amplitude corresponds to the light intensity of that spectral range; amplifying that electrical signal associated with the spectral range having the greatest intensity to a constant value; amplifying each remaining electrical signal with the same amplification factor so that its value is an indication of the ratio between the intensity of the light of the corresponding spectral range and the intensity of the light of the spectral range having the greatest intensity; and using only those spectral range electrical signals for each point scanned that exceed a predetermined minimum value after amplification, for determining the color of the point.

2. A method as defined in claim 1, wherein said constant value is independent of the intensity of the spectral range having the greatest intensity.

3. A method as defined in claim 1 including the step of separating the light from each scanned point into a plurality of different spectral ranges.

4. An arrangement for scanning a colored pattern point-by-pont and for recognizing each point scanned, comprising, in combination, a plurality of phototransducers for receiving light reflected from, or transmitted through, the pattern, each of said phototransducers being responsive to a different spectral range; amplifier means having a plurality of amplifiers with variable amplification factors, each of said amplifiers being connected to a respective one of said phototransducers; means interconnecting said amplifier and adjusting said amplification factors to equal magnitude; signal selection means connected to said phototransducers and selecting the signal from the phototransducer having the maximum intensity; and control means connected to said amplifying means and said signal selection means for setting said amplification factors to a magnitude whereby said signal selected by said selection means is constant, each of said phototransducers being a photodiode means connected at one end to a fixed reference voltage; a respective variable resistor means connected between ground potential and the other end of each said photodiode means; transistor means comprised by each said amplifier and of which the base is connected between the junction of said variable resistor means and said photodiode means; respective collector resistor means connected between the collector of each said transistor means and said fixed reference voltage; respective magnetic field sensitive emitter resistor means connected between the emitter of each said transistor means and ground potential, each said transistor means amplifying the voltage appearing across the respective said variable resistor means, the amplified voltage appearing across respective said collector resistor means; respective Schmitt trigger means connected to the collector of each said transistor means; electromagnetic means with a magnetic core having an air gap within which each said emitter resistor means is located; auxiliary transistor means connected to said electromagnetic means for energizing the same, the emitter of said auxiliary transistor means being connected to said fixed reference voltage and the collector of the auxiliary transistor means being connected to said electromagnetic means; Zener diode means connected at one end with the base of said auxiliary transistor means; and common OR gate means connected at the input to said Zener diode.

5. An arrangement for scanning a colored pattern point-by-point and for recognizing each point scanned, comprising, in combination, a plurality of phototransducers for receiving light reflected from, or transmitted through, the pattern, each of said phototransducers being responsive to a different spectral range; amplifier means having a plurality of amplifiers with variable amplification factors, each of said amplifiers being connected to a respective one of said phototransducers; means interconnecting said amplifiers and adjusting said amplification factors to equal magnitude; signal selection means connected to said phototransducers and selecting the signal from the phototransducer having the maximum intensity; control means connected to said amplifying means and said signal selection means for setting said amplification factors to a magnitude whereby said signal selected by said selection means is constant; and signal discriminating means connected to said amplifying means and responding to only those spectral range electrical signals for each point scanned that exceed a predetermined minimum value after amplification, for determining the color of the point.

6. An arrangement as defined in claim 5, including a different light filter placed between the pattern and each of said phototransducers, whereby the light incident on a phototransducer is limited to a defined spectral range.

7. An arrangement for scanning a colored pattern point-by-point and for recognizing each point scanned, comprising, in combination, a plurality of phototransducers for receiving light reflected from, or transmitted through, the pattern, each of said phototransducers being responsive to a different spectral range; amplifier means having a plurality of amplifiers with variable amplification factors, each of said amplifiers being connected to a respective one of said phototransducers; means interconnecting said amplifiers and adjusting said amplification factors to equal magnitude; signal selection means connected to said phototransducers and selecting the signal from the phototransducer having the maximum intensity; control means connected to said amplifying means and said signal selection means for setting said amplification factors to a magnitude whereby said signal selected by said selection means is constant; and signal amplitude discriminating means connected to the output of said amplifiers and passing those signals whose amplitudes exceed a predetermined level.

8. An arrangement for scanning a colored pattern point-by-point and for recognizing each point scanned, comprising, in combination, a plurality of phototransducers for receiving light reflected from, or transmitted through, the pattern, each of said phototransducers being responsive to a different spectral range; amplifier means having a plurality of amplifiers with variable amplification factors, each of said amplifiers being connected to a respective one of said phototransducers; means interconnecting said amplifier and adjusting said amplification factors to equal magnitude; signal selection means connected to said phototransducers and selecting the signal from the phototransducer having the maximum intensity; and control means connected to said amplifying means and said signal selection means for setting said amplification factors to a magnitude whereby said signal selected by said selection means is constant, each of said amplifiers comprising a transistor, and said phototransducers being each photosensitive resistor means connected to the base of a respective said transistor; respective magnetic field sensitive resistor means connected to the emitter of each said transistor; voltage source means connected to the collector of each said transistor; further amplifier means having a control electrode and an output electrode; Zener diode means having one terminal connected to said control electrode; a common OR gate connecting each said emitter to the other terminal of said Zener diode means; and an electromagnet connected to said output electrode for influencing the resistances of said magnetic field sensitive resistor means.

9. An arrangement as defined in claim 8, including respective resistor means connecting each said collector to said voltage source means.

10. An arrangement as defined in claim 8, including variable resistor means connected to each said base for adjusting the light sensitivity of the corresponding said photosensitive resistor means.

11. An arrangement for scanning a colored pattern point-by-point and for recognizing each point scanned, comprising, in combination, a plurality of phototransducers for receiving light reflected from, or transmitted through, the pattern, each of said phototransducers being responsive to a different spectral range; amplifier means having a plurality of amplifiers with variable amplification factors, each of said amplifiers being connected to a respective one of said phototransducers; means interconnecting said amplifier and adjusting said amplification factors to equal magnitude; signal selection means connected to said phototransducers and selecting the signal from the phototransducer having the maximum intensity; and control means connected to said amplifying means and said signal selection means for setting said amplification factors to a magnitude whereby said signal selected by said selection means is constant, each of said amplifiers comprising a transistor, the emitter of which is connected to a respective one of said phototransducers; voltage source means connected to the collector of each said transistor; first amplifier means having a control electrode and an output electrode; Zener diode means having one terminal connected to said control electrode; a common OR gate connecting each said collector to the other terminal of said Zener diode means; and second amplifier means connected to said output electrode and to the base of each said transistor for controlling the amplification of each said transistor.

12. An arrangement as defined in claim 11, wherein each of said phototransducers is a photoresistor means having a color filter for sensing a predetermined color; each said emitter being connected to one end of a respective said photoresistor means, the other end of said photoresistor means being connected to ground potential, said voltage source means providing a fixed reference voltage, and further including respective collector resistor means connecting each said collector to said fixed reference voltage, the voltage appearing across each said collector resistor means being the amplified voltage of that appearing across the corresponding said photoresistor means; respective Schmitt trigger means connected to the collector of each said transistor; said second amplifier means comprising a transistor having its collector connected to the base of each said transistor and its emitter connected to ground potential; voltage dividing resistor means connected between the collector of said transistor of said second amplifying means and said fixed reference voltage, said voltage dividing resistor means and the emitter collector path of said auxiliary transistor forming a voltage dividing circuit; said first amplifier means having a transistor of which the collector is connected to the base of said transistor of said second amplifying means, the conductivity type of said second amplifier means and said first amplifier means being opposite; and Zener diode means connected at one end to the base of said first amplifier means transistor.

13. An arrangement as defined in claim 11, including respective resistor means connecting each said collector to said voltage source means.

14. A method for scanning and sensing colored patterns, including the steps of optically scanning the pattern point-by-point; sensing the color of each point by sensing a plurality of spectral ranges; producing for each spectral range an electrical signal of which the amplitude corresponds to the light intensity of that spectral range; amplifying that electrical signal associated with the spectral range having the greatest intensity to a constant value which is independent of the intensity of the spectral range having the greatest intensity; amplifying each remaining electrical signal with the same amplification factor so that its value is an indication of the ratio between the intensity of the light of the corresponding spectral range and the intensity of the light of the spectral range having the greatest intensity.

15. An arrangement for scanning a colored pattern point-by-point and for recognizing each point scanned, comprising, in combination, a plurality of phototransducers for receiving light reflected from, or transmitted through, the pattern, each of said phototransducers being responsive to a different spectral range; amplifier means having a plurality of amplifiers with variable amplification factors, each of said amplifiers being connected to a respective one of said phototransducers; means interconnecting said amplifiers and adjusting said amplification factors to equal magnitude; signal selection means connected to said phototransducers and selecting the signal from the phototransducer having the maximum intensity; control means connected to said amplifying means and said signal selection means for setting said amplification factors to a magnitude whereby said signal selected by said selection means is constant and independent of the intensity of the spectral range having the maximum intensity.

* * * * *